July 3, 1923.  1,460,513

D. E. ROSS

ANTIRATTLING BUSHING

Filed May 24, 1922

Inventor
David E. Ross
By Alexander Sowell
Attorneys

Patented July 3, 1923.

1,460,513

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

ANTIRATTLING BUSHING.

Application filed May 24, 1922. Serial No. 563,422.

*To all whom it may concern:*

Be it known that I, DAVID E. Ross, a citizen of the United States, residing at La Fayette, in the county of Tippecanoe and State of Indiana, have invented certain new and useful Improvements in Antirattling Bushings; and I hereby declare that the following is a full, clear, and exact description thereof, reference being had to the accompanying drawings, which form part of this specification.

This invention relates to the steering gears of automobiles and the like, and the object of the invention is to provide a novel combined bushing and anti-rattler adapted to be placed in the steering post between the outer casing and steering shaft, just under the steering wheel, said bushing furnishing a bearing and at the same time preventing rattling.

In the accompanying drawings I have illustrated bushings embodying the invention, and will explain the same with reference thereto, to enable others to adopt and use the same; and refer to the claims for summaries of the invention and novel features of construction, and novel combinations of parts, for which protection is desired.

Figure 1:
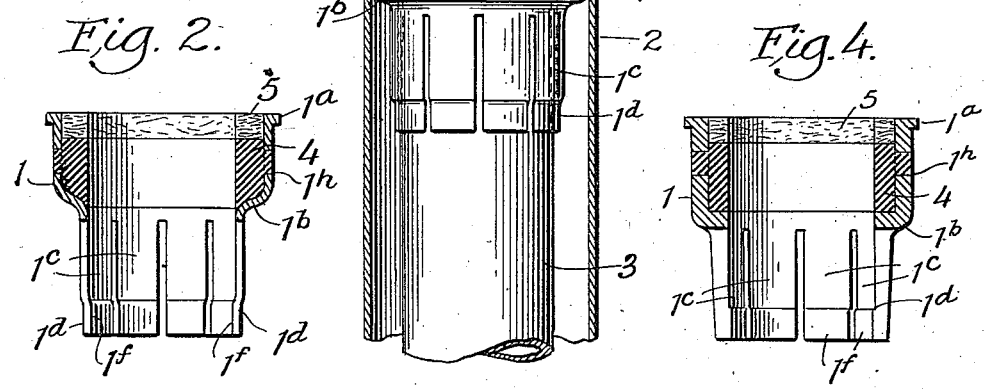
Fig. 1 is a detail section through part of a steering post and wheel of usual construction, with my novel antirattling bushing applied thereto.
Figure 2:
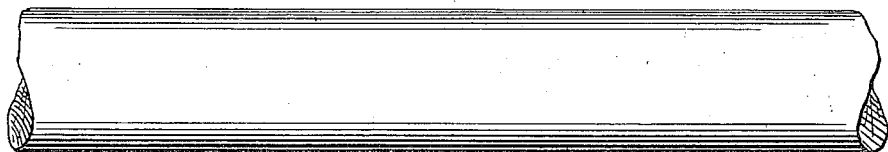
Fig. 2 is an enlarged section through a stamped metal bushing, detached.
Figure 4:
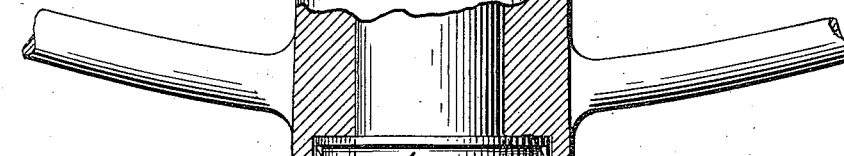
Fig. 4 is an enlarged section through a cast metal bushing.
Figure 3:
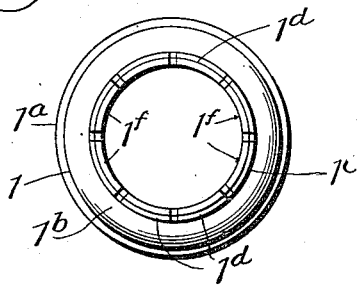
Fig. 3 is a bottom end view of the bushing shown in Fig. 2.
Figure 5:
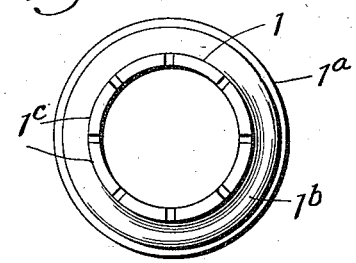
Fig. 5 is a bottom end view of the bushing shown in Fig. 4.

The bushing may be made of drawn metal as shown in Figs. 2 and 3, or of cast metal as shown in Figs. 4 and 5. The bushing consists of a hollow cylindrical body having an upper portion 1, of an exterior diameter which will make a close fit within the end of the outer casing 2 of the steering post into which the bushing is inserted, as shown in Fig. 1. The body portion 1 is formed with a small exterior annular flange $1^a$ at top whose width is approximately equal to the thickness of the outer casing of the steering post.

The lower portion of the body is contracted to form a flange or shoulder $1^b$, the interior diameter of which is slightly larger than the diameter of the steering shaft 3 to prevent binding; and below this shoulder the body has a cylindrical portion of less diameter than the portion 1.

Formed integral with, and depending from, this shoulder $1^b$ is an annular series of spring fingers $1^c$ of suitable width and length, and are adapted to contact only near their lower ends with the steering shaft 3 and to hold the same flexibly yet securely at all times. Preferably the fingers $1^c$ are formed by slotting the contracted lower cylindrical portion of the body, said slots extending (as shown in Figs. 2 and 4) from the shoulder $1^b$ to the lower end of the bushing.

As shown in Figs. 2 and 4, there are eight fingers $1^c$, and the lower ends of such fingers, for a distance of about ¼ inch are joggled inwardly, as at $1^d$, to form short contact surfaces $1^f$ on the tips and inner ends of the fingers $1^c$ which contact surfaces engage with the steering shaft 3.

By this construction, the fingers $1^c$ do not come in contact with the steering shaft 3, except at the short contact surfaces $1^f$ on the joggled ends $1^d$ thereof, so that no injurious strain can be exerted upon the fingers $1^c$ near their bases. These fingers $1^c$ grip the steering shaft 3 yieldingly and prevent rattling or chattering of said shaft within the casing 2.

As shown in Fig. 1, the bushing is adapted to be inserted in the top of the outer casing 2, of the steering post, until its annular flange $1^a$ engages the top of said casing 2.

The steering shaft 3 extends through the bushing, and concentric therewith, and is centered in the bushing by a bearing ring 4. As shown in Figs. 1, 2 and 4, the ring 4 is formed by pouring Babbitt metal into the upper bushing above the shoulder 1^h and between the inner wall thereof and the steering shaft 3. In the side of the body portion 1 I preferably form perforations 1^h which are filled by the Babbitt metal at the time of pouring, thereby effectually locking the ring 4 in place and providing a permanent antifriction bearing for the steering shaft 3 in the bushing; and making a close fit between the steering shaft and bushing.

Preferably an annular space is left in the bushing above the ring 4 for the reception of a lubricating washer 5, which may be of felt, to hold and feed a lubricant to the bearing.

My novel bushing provides an anti-friction bearing for the shaft, and effectually prevents rattling and chattering of the shaft in the casing.

The bearing ring 4 could be formed of bronze or other anti-frictional material and pressed into the bushing, instead of being cast therein.

What I claim is:

1. A bushing adapted to be mounted in the casing of a steering post and surround the steering shaft and having spring fingers adapted to engage the steering shaft, for the purpose specified.

2. In combination with a bushing as set forth in claim 1, a ring in the bushing to center the shaft therein substantially as described.

3. A bushing as set forth in claim 1 having perforations and a babbitt ring cast in said bushing and filling the perforations whereby the ring is locked in the bushing, substantially as described.

4. In combination with a bushing as set forth in claim 1, a ring in the bushing to center the shaft therein, and a lubricating washer mounted in said bushing above said ring, for the purpose specified.

5. A bushing as set forth in claim 1 having perforations and a babbitt ring cast in said bushing and filling the perforations whereby the ring is locked in the bushing, and a lubricating washer mounted in said bushing above said ring, for the purpose specified.

6. In combination with a steering post and its casing; a bushing for the steering post mounted in the casing and having integral spring fingers depending therefrom and engaging the steering shaft, for the purpose described.

7. A bushing comprising a cylindrical body portion having an exterior annular flange at its upper end and a contracted portion at the lower end of said body portion concentric therewith adapted to support a bearing ring, and integral spring fingers depending from said contracted portion, for the purpose specified.

8. In combination with a bushing as set forth in claim 7; a bearing ring mounted in the body portion of the bushing, above the contracted portion thereof.

9. In combination with devices as set forth in claim 7; a bearing ring mounted in the body portion of the bushing above the contracted portion thereof and a lubricating washer mounted in said body portion above said ring, for the purpose specified.

10. In combination with a steering shaft and its casing; of a bushing mounted in the casing and surrounding the shaft, and having spring fingers formed integral therewith adapted to engage the steering shaft, for the purpose specified.

11. In combination with devices as set forth in claim 10; a bearing ring mounted in the bushing, above the fingers and surrounding the steering shaft.

12. In combination with a steering post and its casing; a bushing mounted in the upper end of the casing and engaging the steering shaft and having integral spring fingers depending therefrom adapted to engage the steering shaft at their lower ends only, for the purpose specified.

13. In combination with devices as set forth in claim 12; a bearing ring mounted in the bushing above said fingers and surrounding said steering shaft; and a lubricating washer mounted in said bushing above said ring, for the purpose specified.

14. In combination with a steering shaft and its casing; a bushing comprising a cylindrical body portion adapted to be closely fitted in the upper end of the casing and having a contracted portion at the lower end of said body portion and adapted to support a bearing ring engaging the steering shaft and spring fingers depending from said contracted portion adapted to engage said steering shaft at their lower ends only.

15. In combination with devices as set forth in claim 14, a babbitt ring in the bushing to center the shaft therein.

16. In combination with devices as set forth in claim 14, a babbitt ring in said bushing and a lubricating washer mounted in said bushing above said ring, for the purpose specified.

17. In combination with a steering shaft and a casing therefor; a bushing comprising a cylindrical body portion adapted to be closely fitted in the upper end of the casing and having an exterior annular flange at its upper end adapted to engage the upper end of said casing, and a contracted portion at the lower end of said body portion concentric with and adapted to support a bearing ring engaging the steering shaft, and spring fingers depending from said contracted portion adapted to engage said steering shaft at their lower ends only.

18. In combination with devices as set forth in claim 17; a babbitt bearing ring in the body portion of said bushing, above said contracted portion and surrounding said steering shaft.

19. In combination with devices as set forth in claim 17; a bearing ring mounted in the body portion of the bushing above said contracted portion and surrounding said steering shaft; and a lubricating washer mounted in said body portion above said babbitt ring, for the purpose specified.

In testimony that I claim the foregoing as my own, I affix my signature.

DAVID E. ROSS.